US012260735B1

(12) United States Patent
Rodriguez

(10) Patent No.: US 12,260,735 B1
(45) Date of Patent: Mar. 25, 2025

(54) ANT-LOSS CELL PHONE CASE

(71) Applicant: Juana Rodriguez, Reading, PA (US)

(72) Inventor: Juana Rodriguez, Reading, PA (US)

( * ) Notice: Subject to any disclaimer, the term of this patent is extended or adjusted under 35 U.S.C. 154(b) by 60 days.

(21) Appl. No.: 18/100,218

(22) Filed: Jan. 23, 2023

(51) Int. Cl.
| G08B 21/24 | (2006.01) |
| A45C 11/00 | (2006.01) |
| A45C 13/18 | (2006.01) |
| G08B 3/10  | (2006.01) |
| G08B 6/00  | (2006.01) |
| H04B 1/3888 | (2015.01) |

(52) U.S. Cl.
CPC .............. G08B 21/24 (2013.01); A45C 11/00 (2013.01); A45C 13/18 (2013.01); G08B 3/1016 (2013.01); G08B 6/00 (2013.01); H04B 1/3888 (2013.01); *A45C 2011/002* (2013.01)

(58) Field of Classification Search
CPC ........ G08B 21/24; G08B 3/1016; G08B 6/00; A45C 11/00; A45C 13/18; A45C 2011/002; H04B 1/3888
See application file for complete search history.

(56) References Cited

U.S. PATENT DOCUMENTS

| 7,333,776 B1 | 2/2008 | York |
| 9,704,374 B1 | 7/2017 | Miller |
| 2005/0181745 A1* | 8/2005 | Wood .................... H04B 1/3888 455/575.8 |
| 2007/0222592 A1* | 9/2007 | Zelman .............. G08B 13/1427 340/539.32 |
| 2012/0172095 A1* | 7/2012 | McDaniel .............. G08B 21/24 455/575.1 |
| 2016/0007704 A1* | 1/2016 | Liebers ................ H04B 1/3888 206/38 |
| 2022/0151354 A1* | 5/2022 | Soderstrom ............ A45C 13/02 |

FOREIGN PATENT DOCUMENTS

| DE | 102005036337 A1 * | 2/2007 | ......... G08B 13/1427 |
| FR | 2813421 A1 * | 3/2002 | ......... G08B 13/1427 |
| WO | WO-2018006764 A1 * | 1/2018 | ........... G06F 1/1652 |

* cited by examiner

*Primary Examiner* — Rufus C Point
(74) *Attorney, Agent, or Firm* — Sanchelima & Associates, P.A.; Jesus Sanchelima; Christian Sanchelima

(57) ABSTRACT

An ant-loss cell phone case including a transmitter assembly and a receiver assembly. The transmitter assembly includes a transmitter device coupled in a rare compartment of a cell phone case. The transmitter assembly is protected by a compartment cover which includes inside thereof a battery to power the transmitter device allowing to broadcast a signal. The receiver assembly includes a receiver device associated to the transmitter device, wherein the receiver assembly is attachable to the user's body or belonging by means of a swivel snap hook and will emit an alert if the transmitter assembly and the receiver assembly are farther than a predetermined distance therebetween.

10 Claims, 4 Drawing Sheets

ANT-LOSS CELL PHONE CASE

BACKGROUND OF THE INVENTION

1. Field of the Invention

The present invention relates to cell phone case and, more particularly, to a ant-loss cell phone case that includes a transmitter device coupled to a cell phone case wherein a receiver device attachable to the user's body or to the user's belonging is associated to the transmitter and will emit an alert when the transmitter is farther than a predetermined distance.

2. Description of the Related Art

Several designs for cell phone cases have been designed in the past. None of them, however, include a cell phone case with a compartment wherein an integral transmitter detachable connected to a cover is coupled to the compartment. An independent device attachable to a user's body or to a user's belonging comprising a receiver device protected by a housing that is associated with the integral transmitter allowing it to emit an alert when the transmitter is outside the signal range of the integral receiver device.

Applicant believes that a related reference corresponds to U.S. Pat. No. 9,704,374 issued for device for locating a cell phone using a remote key fob. Applicant believes that another related reference corresponds to U.S. Pat. No. 7,333,776 issued for phone alert. None of these references, however, teach of an anti-loss cell phone system comprising a case with an integral transmitter, a receiver which is attachable to the user's body, where the system will emit audible alerts if the case is farther than a predetermined distance from the receiver.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a cell phone case to protect the cell phone device from all sorts of damage.

It is another object of this invention to provide an anti-loss device attachable to a cell phone case It is still another object of the present invention to provide an anti-loss device that will emit an alert when the cell phone device is farther from a predetermined distance It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
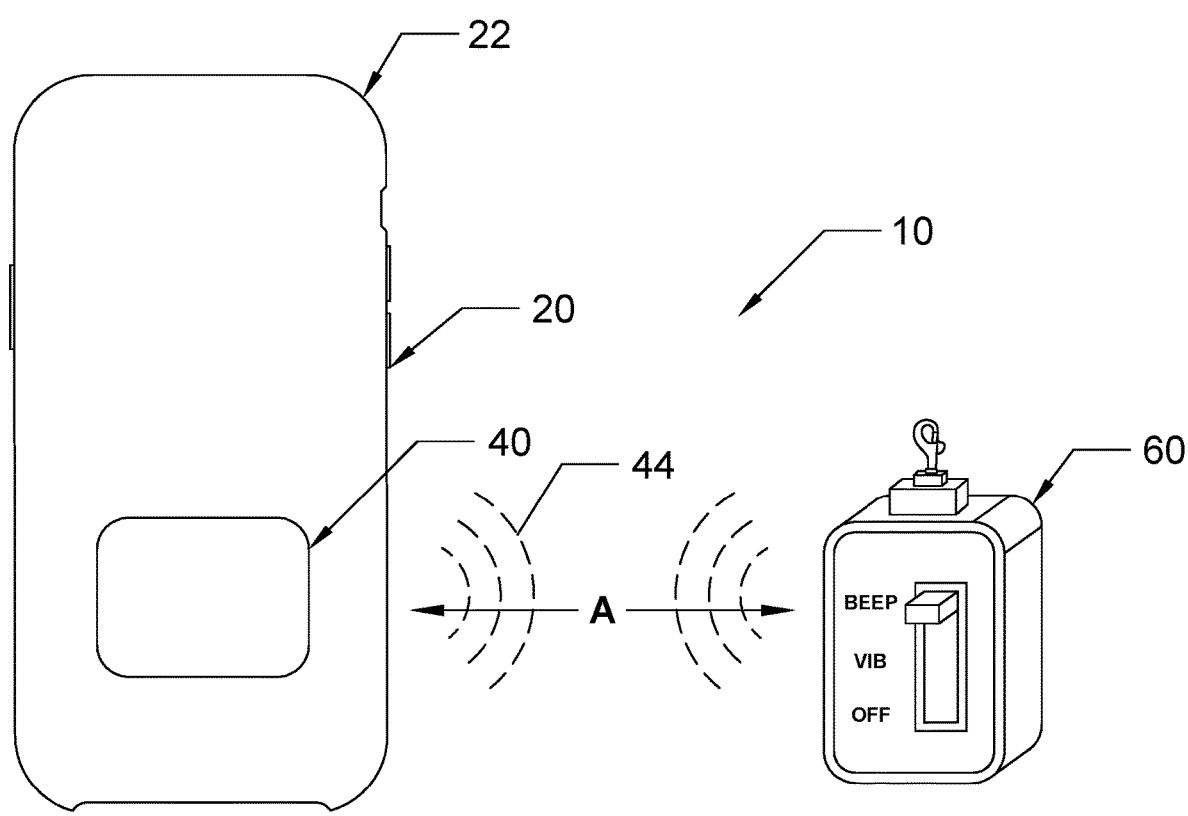
FIG. 1 represents an operational view according to an exemplary embodiment of the present invention 10 comprising a transmitter assembly 40 attached to a rear cell phone case 100 and associated to a receiver assembly 60 that may be alerting when the distance is farther therebetween.

Referring now to the drawings, where the present invention is generally referred to with numeral 10, it can be observed that it basically includes a cell phone cover assembly 20, a transmitter assembly 40, a receiver assembly 60 and various exemplary embodiments (100). It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
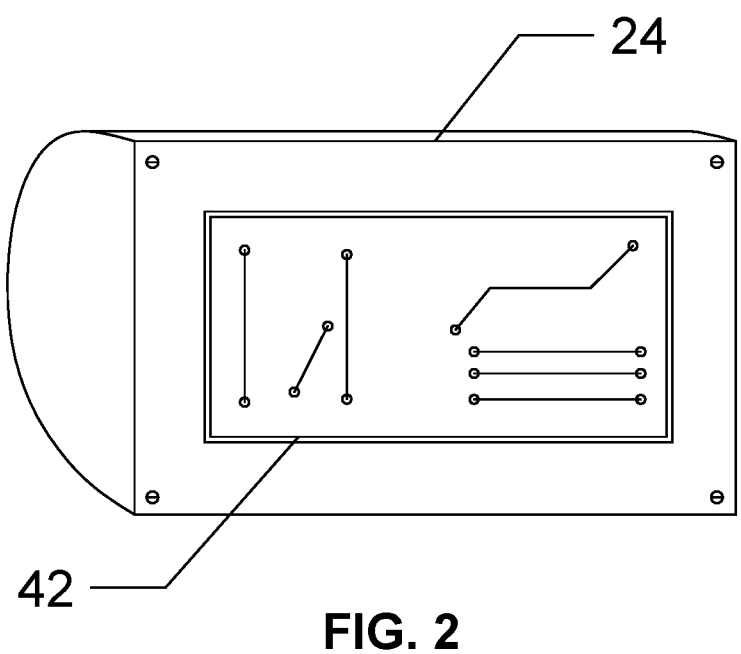
FIG. 2 shows an isometric view of the compartment cover 24 with the transmitter assembly 40 attached thereof.

Cell phone cover assembly 20 may include a cell phone case 22, a compartment 24 and a compartment cover 26. In an exemplary embodiment, cell phone case 22 may have a suitable shape known in the art to accommodate the size of a mobile communication device. It should be suitable that the cell phone case 22 may be made of a plastic material, a silicon material, a carbon fiber material or any other material known in the art allowing to protect the mobile communication device from being damaged. In one embodiment, cell phone case 22 further includes said compartment 24, wherein the compartment 24 is located on a backside of the cell phone case 22. In a preferred embodiment, compartment 24 may be placed on a portion of an area of the cell phone case 22, wherein the compartment 24 may have a rectangular shape, a square shape, an oval shape, a regular shape, an irregular shape or any other variation thereof. In a preferred embodiment, the compartment 24 included in the cell phone case 22 may have a depth smaller than the thickness of the cell phone case 22. In an exemplary embodiment, cell phone case 22 further includes said compartment cover 26, wherein the compartment cover 26 may conform with the shape of the compartment 24. In one preferred embodiment, compartment cover 26 may have a greater area with respect to the compartment's area 24 allowing said compartment 24 to be covered. Compartment cover 26 may have a shape of a vertical cross-sections of a cylinder, wherein a plane parallel to the side of the cylinder creates a rectangular cross-section, best depicted in FIG. 2.

Figure 3:
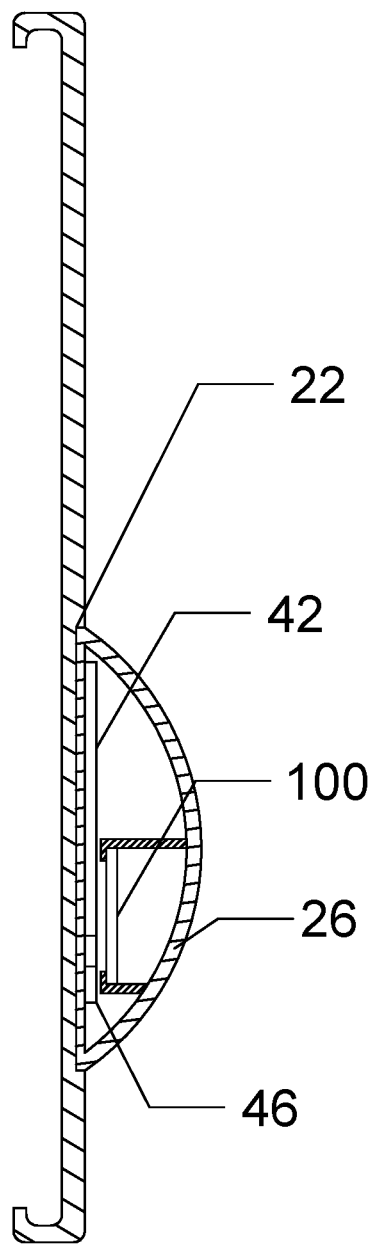
FIG. 3 illustrates a perspective sectional view of the transmitter assembly 40 coupled to the cell phone cover assembly 20 showing the integral transmitter device operationally connected to the first battery 102 of the compartment cover 24 by means of a battery connector.

The rectangular cross-section has a bigger area than the area of the compartment 24 but smaller than the backside of the cell phone case 22. In an exemplary embodiment, the compartment cover 26 may be attached to the housing by means of fasteners, wherein the compartment cover 26 is attached around a periphery of the compartment 24 allowing it to be covered by the rectangular shape of the compartment cover 26. It should be suitable for compartment cover 26 to include an internal compartment on the rectangular cross-section side, wherein said internal compartment may include an integral transmitter device 42 operatively connected to a first battery 100. In other embodiment, the internal compartment holds the integral transmitter device 42 by means of brackets, better illustrated in FIG. 3. First battery 100 may be a round battery well known in prior art.

Transmitter assembly 40 includes an integral transmitter device 42, a signal 44, and a battery connector 46. In a suitable embodiment, integral transmitter device 42 may be an electronic element, a circuit board or any other variation thereof, wherein integral transmitter device feature is to broadcast a signal 44 while is powered by means of a first battery 100. In an exemplary embodiment, signal 44 may be a radio frequency in its various frequency ranges. In a preferred embodiment, the integral transmitter device is placed inside the internal compartment of the compartment cover 26 and it is supported by means of brackets. In other embodiment, the integral transmitter device 42 is operatively connected to the first battery 100 by means of a battery connector 46 allowing the integral transmitter device to constantly broadcast the signal 44. In a preferred embodiment, battery connector 46 may be a sewable battery holder, a coin cell holder, a plastic holder or any other suitable battery connector for round batteries known in art. Battery connector 46 is placed inside the internal compartment of the compartment cover 26.

Receiver assembly includes a receiver device 62, a housing 72. In an exemplary embodiment, receiver device 62 may be an electronic element, a circuit board or any other variation thereof. Receiver device 62 is powered by means of a second battery 102, wherein the second battery 102 may be a round battery or any other battery known in prior art. It should be suitable for receiver device 62 to be associated with respect to integral transmitter device 42, wherein the signal 44 broadcasted by the integral transmitter device 42 may be received by the receiver device 62 permitting a constant communication therebetween. In a suitable embodiment, the receiver device further includes an audible alert 64 and a sensitive alert 66. It should be considered for signal 44 to have a predetermined wavelength range allowing to limit the distance where the integral transmitter device 42 and the receiver device 62 are associated, thereby when the receiver no longer receives the broadcasted signal 44 from the integral transmitter device 42 will emit an audible alert 64 or a sensitive alert 66. In other embodiments, audible alert 64 may be a constant sound, an intermittent sound or any other variation thereof. Sensitive alert 66 may be a constant vibration alert, an intermittent vibration alert or any other variation thereof. In one embodiment, receiver assembly 60 further includes a switch device 68, wherein the switch device 68 is capable of being configured to select the audible alert 64, the sensitive alert 66 or to turn off the receiver device.

Figure 4:
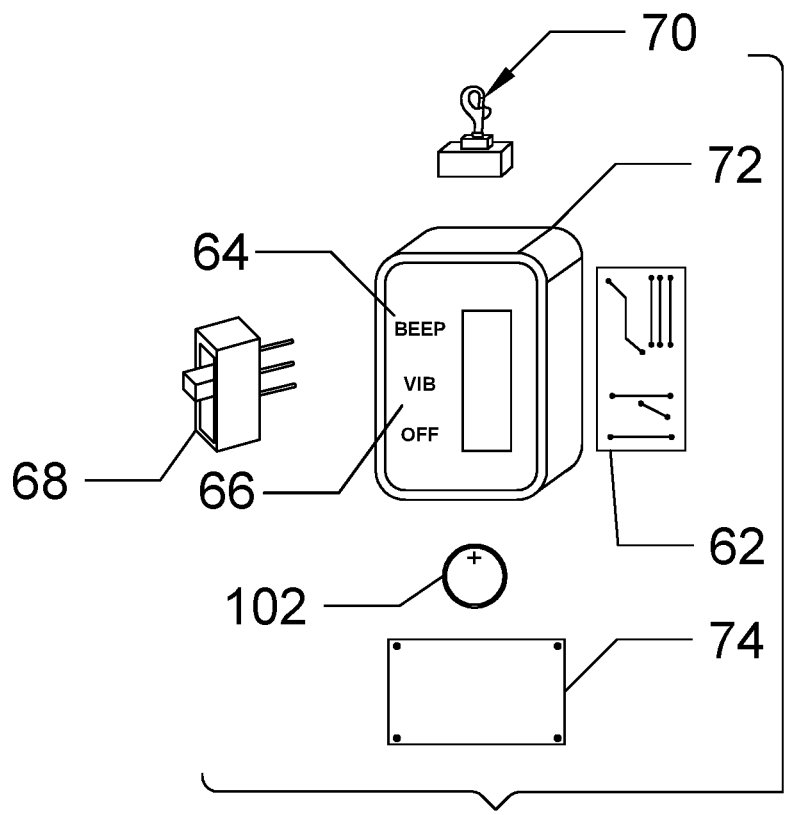
FIG. 4 is a representation of an exploded view of the receiver assembly 60 including the housing 72 that protects the receiver device 62 within thereof, the switch device 68 wherein an audible alert 64, a sensitive alert 66 and a turning off option that can be operatively configured, the swivel snap hook 70 that can be attachable to the user's body and the second battery 74 secured by means of a second battery cover to power the receiver device 62.
Figure 5:
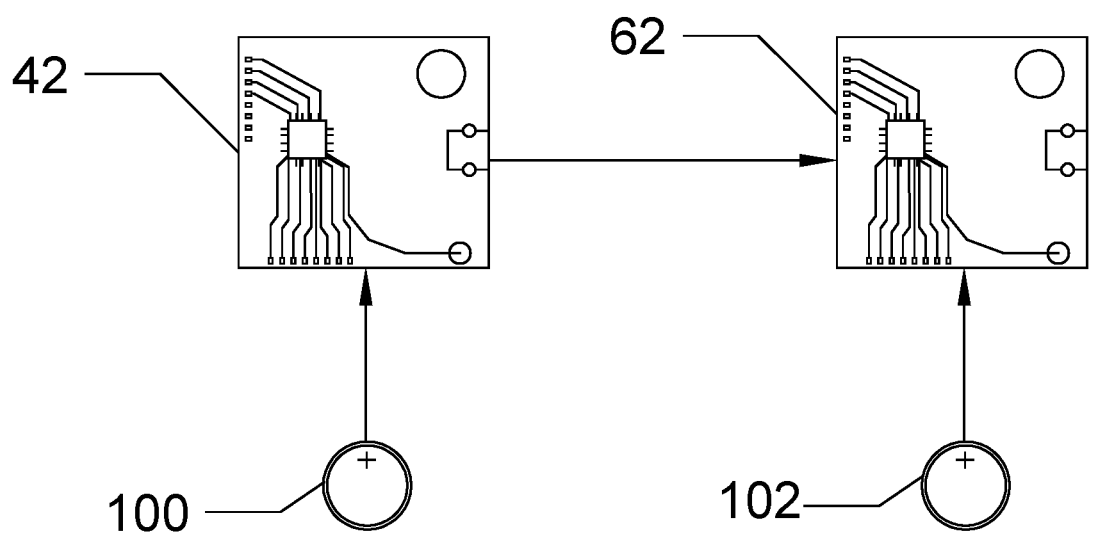
FIG. 5 is a representation of the association between the integral transmitter device 42 powered by a first battery 102 and the receiver device 62 powered by a second battery 104.

FIG. 4 represents receiver assembly 60, wherein a housing 72 may includes within thereof the receiver device 62, the second battery 102 and the switch device 68. In a preferred embodiment, housing 72 may have a rectangular shape, a square shape, an oval shape, a regular shape, an irregular shape or any other variation thereof, wherein the volume of said housing may be suitable to include the elements of the receiver assembly 60 herein described. The receiver device 62 with its elements are mounted within the housing 72 by means of an opening placed at the bottom side thereof. In a front side of the housing 72 an opening is included, wherein an actuator from the switch device 68 protrudes allowing a user to select a predetermined configuration thereof. In other embodiment, housing 72 has indicia upon its external front side surface, wherein the indicia may include if the audible alert 64, sensitive alert 66 or if the receiver device 62 is turned off by means of the switch device 68 configuration. In a preferred embodiment, the second battery 102 is operatively connected to the receiver device 62, wherein the elements herein described are secured within the housing 72 by a bottom second battery cover 74, wherein said second battery cover 74 is attached to the bottom side of the housing 72 by means of fastener. In other embodiments, housing 72 further includes an attachable device 70 in a top side thereof, wherein the attachable device 70 may be a swivel snap hook, a magnet, a strap or any other suitable device to attach the receiver assembly 60 to a user's boy, a user's clothing or a user's belonging.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An ant-loss cell phone case, comprising:
   a cell phone cover assembly including a cell phone case, said cell phone case includes a compartment, said cell phone cover assembly further includes a compartment cover detachably connected to the cell phone case, wherein said compartment cover includes an internal compartment, wherein said compartment cover has a vertical cross-section of a cylinder, wherein a plane parallel to the side of the cylinder creates a rectangular cross-section shape;
   a transmitter assembly having an integral transmitter device, said integral transmitter device includes a battery connector, said integral transmitter device broadcasts a signal, wherein said integral transmitter device is powered by a first battery, said first battery is a round button cell battery; and
   a receiver assembly including a receiver device associated to said integral transmitter device, said receiver assembly is powered by a second battery, said receiver device detects said broadcasted signal, when said broadcasted signal is not detected by said receiver device an audible alert is emitted that is selected by means of a switch device, wherein said switch device allows to select between at least two predetermined alerts or to turn off the receiver assembly, wherein said receiver assembly includes a swivel snap hook, said swivel snap hook is configured to attach said receiver assembly to cloths or user's belongings.

2. The ant-loss cell phone case of claim 1, wherein said cell compartment has a rectangular shape, wherein said compartment is placed at the back side of the cell phone case.

3. The ant-loss cell phone case of claim 1, wherein said compartment has a depth smaller than the thickness of said cell phone case.

4. The ant-loss cell phone case of claim 1, wherein said rectangular cross-section has a bigger area than the compartment area and smaller than the cell phone case backside area.

5. The ant-loss cell phone case of claim 1, wherein said integral transmitter device is mounted inside of said internal compartment of the compartment cover.

6. The ant-loss cell phone case of claim 1, wherein said integral transmitter device broadcast a radio frequency signal.

7. The ant-loss cell phone case of claim 1, wherein said receiver device has an audible alert and a sensitive alert when said integral transmitter device is farther than a predetermined distance from the receiver or vice versa.

8. The ant-loss cell phone case of claim 7, wherein said audible alert is a sound alert and said sensitive alert is a vibration alert.

9. The ant-loss cell phone case of claim 1, wherein said second battery is a round button cell battery.

10. An ant-loss cell phone case, consisting of:
a cell phone cover assembly including a cell phone case, said cell phone case includes a compartment at the backside of said cell phone case, wherein said compartment has a depth smaller than the thickness of said cell phone case, said cell phone cover assembly further includes a compartment cover detachably connected to the housing by means of fasteners, wherein said compartment cover has a vertical cross-section of a cylinder shape, wherein a plane parallel to the side of the cylinder creates a rectangular cross-section shape, said compartment cover is attached to the periphery of said compartment, wherein said compartment cover has a bigger area than the area of said compartment, said compartment cover is attached to the periphery of said compartment, said compartment cover further includes an internal compartment;
a transmitter assembly having an integral transmitter device, said integral transmitter devices includes a battery connector operatively connected to a first round button cell battery, thereby powering said integral transmitter device, said integral transmitter device broadcasts a radio frequency signal, wherein said radio frequency signal has a short wavelength range; and
a receiver assembly including a receiver device associated to said integral transmitter device by means said radio frequency signal, wherein said receiver device no longer receives said radio frequency signal emits an alert, a second round button cell battery is operatively connected to said receiver device, said receiver device is mounted inside of a housing, wherein said housing further includes a second battery cover allowing to secure said receiver device and said second battery within said housing, said receiver assembly further includes an audible alert and a sensitive alert, wherein said sensitive alert is a vibration feature, said receiver assembly further includes a switch device connected to said receiver device allowing to select between the audible alert or the sensitive alert when said integral transmitter device is farther than a predetermined distance from said receiver device, said switch device has a turn off configuration, said housing includes an opening at a front side thereof, wherein an actuator from the switch device protrudes from said opening allowing the user to interact with said actuator, wherein said receiver assembly includes a swivel snap hook, said swivel snap hook is configured to attach said receiver assembly to cloths or user's belongings.

\* \* \* \* \*